(12) United States Patent
Asanuma et al.

(10) Patent No.: US 9,109,492 B2
(45) Date of Patent: Aug. 18, 2015

(54) EXHAUST PURIFICATION SYSTEM OF INTERNAL COMBUSTION ENGINE

(75) Inventors: Takamitsu Asanuma, Mishima (JP); Kazuhiro Umemoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 485 days.

(21) Appl. No.: 13/318,973

(22) PCT Filed: Jun. 16, 2009

(86) PCT No.: PCT/JP2009/061269
§ 371 (c)(1),
(2), (4) Date: Nov. 4, 2011

(87) PCT Pub. No.: WO2010/146720
PCT Pub. Date: Dec. 23, 2010

(65) Prior Publication Data
US 2012/0073273 A1     Mar. 29, 2012

(51) Int. Cl.
*F01N 3/10* (2006.01)
*F01N 3/20* (2006.01)
(Continued)

(52) U.S. Cl.
CPC .............. *F01N 3/2066* (2013.01); *F01N 3/035* (2013.01); *F01N 3/0814* (2013.01); *F01N 3/0821* (2013.01); *F01N 3/106* (2013.01); *F01N 13/009* (2014.06); *F01N 13/0097* (2014.06); *F01N 2570/14* (2013.01); *F01N 2570/145* (2013.01);
(Continued)

(58) Field of Classification Search
CPC ....... F01N 3/105; F01N 3/2066; F01N 3/208; F01N 3/106; F01N 3/0842; F01N 2610/02; F01N 2900/1616; F01N 2510/063

USPC ............................ 60/284, 288, 295, 300, 301
See application file for complete search history.

(56) References Cited

U.S. PATENT DOCUMENTS

| 6,047,542 A | 4/2000 | Kinugasa et al. |
| 8,061,122 B2 * | 11/2011 | Chaineux et al. ............... 60/286 |

(Continued)

FOREIGN PATENT DOCUMENTS

| CN | 1395501 A | 2/2003 |
| CN | 1946470 A | 4/2007 |

(Continued)

OTHER PUBLICATIONS

International Preliminary Report on Patentability issued for PCT/JP2009/061269 dated Sep. 14, 2009 (with translation).

(Continued)

*Primary Examiner* — Thomas Denion
*Assistant Examiner* — Patrick Maines
(74) *Attorney, Agent, or Firm* — Oliff PLC

(57) ABSTRACT

An exhaust purification system of an internal combustion engine including an ammonia oxidation catalyst device and an ammonia holding device arranged immediately upstream of the ammonia oxidation catalyst device is provided. The ammonia holding device has a solid acid, holds ammonia to restrain the ammonia from flowing into the ammonia oxidation catalyst device when a temperature of the ammonia oxidation catalyst device is within a $N_2O$ producing temperature range, and releases the held ammonia to make the ammonia flow into the ammonia oxidation catalyst device when the temperature of the ammonia oxidation catalyst device is out of the $N_2O$ producing temperature range.

2 Claims, 3 Drawing Sheets

(51) Int. Cl.
*F01N 3/035* (2006.01)
*F01N 3/08* (2006.01)
*F01N 13/00* (2010.01)

(52) U.S. Cl.
CPC ......... *F01N 2570/18* (2013.01); *F01N 2610/02* (2013.01); *Y02C 20/10* (2013.01); *Y02T 10/24* (2013.01)

(56) References Cited

U.S. PATENT DOCUMENTS

| | | | |
|---|---|---|---|
| 2003/0143141 A1* | 7/2003 | Schwefer et al. | 423/235 |
| 2004/0200271 A1* | 10/2004 | van Nieuwstadt | 73/118.1 |
| 2007/0160508 A1* | 7/2007 | Doumeki et al. | 422/168 |
| 2007/0193253 A1* | 8/2007 | Tsumagari | 60/286 |
| 2008/0038174 A1* | 2/2008 | Mori et al. | 423/237 |
| 2008/0226545 A1* | 9/2008 | Bull et al. | 423/700 |
| 2009/0011927 A1* | 1/2009 | Chen et al. | 502/66 |
| 2009/0266063 A1* | 10/2009 | Gandhi et al. | 60/301 |
| 2010/0050604 A1* | 3/2010 | Hoard et al. | 60/286 |
| 2010/0058746 A1 | 3/2010 | Pfeifer et al. | |
| 2010/0180579 A1* | 7/2010 | Huang et al. | 60/297 |
| 2010/0229535 A1* | 9/2010 | Theis | 60/274 |
| 2010/0281853 A1* | 11/2010 | Toshioka et al. | 60/276 |
| 2010/0326052 A1* | 12/2010 | Sun | 60/274 |
| 2011/0041480 A1* | 2/2011 | Yasui et al. | 60/286 |
| 2011/0058999 A1* | 3/2011 | Ettireddy et al. | 423/213.5 |
| 2013/0028818 A1* | 1/2013 | Eckhoff et al. | 423/212 |
| 2013/0312392 A1* | 11/2013 | Henry et al. | 60/274 |
| 2014/0056789 A1* | 2/2014 | Mussmann et al. | 423/212 |

FOREIGN PATENT DOCUMENTS

| | | | | |
|---|---|---|---|---|
| EP | 1536111 A1 * | 6/2005 | | F01N 3/10 |
| EP | 1 736 232 A1 | 12/2006 | | |
| EP | 1 961 933 A1 | 8/2008 | | |
| JP | B2-2967113 | 10/1999 | | |
| JP | A-2001-50035 | 2/2001 | | |
| JP | 2004211676 A * | 7/2004 | | F01N 3/08 |
| JP | A-2005-61362 | 3/2005 | | |
| JP | A-2005-238195 | 9/2005 | | |
| JP | 2006342778 A * | 12/2006 | | |
| JP | 2007239752 A * | 9/2007 | | |
| JP | A-2008-255899 | 10/2008 | | |
| JP | 2010203320 A * | 9/2010 | | |
| JP | 2010229820 A * | 10/2010 | | |
| WO | WO 2009099040 A1 * | 8/2009 | | B01D 53/86 |
| WO | WO 2010146717 A1 * | 12/2010 | | F01N 3/08 |
| WO | WO 2013022517 A1 * | 2/2013 | | |

OTHER PUBLICATIONS

International Search Report dated Sep. 29, 2009 in International Application No. PCT/JP2009/061269 (with translation).

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

In an exhaust system of an internal combustion engine which performs lean combustion such as in a diesel engine, a $NO_x$ catalyst device is arranged to purify $NO_x$ in the exhaust gas. A known $NO_x$ catalyst device produces ammonia by hydrolysis of urea supplied with the exhaust gas and selectively reduces $NO_x$ in the exhaust gas by use of the produced ammonia $NH_3$ as a reducing material.

To decrease ammonia which is not used to reduce $NO_x$ in such a selectively reduction type $NO_x$ catalyst device and which is released into the atmosphere, it has been suggested that an ammonia oxidation catalyst device be arranged downstream of the selectively reduction type $NO_x$ catalyst device.

However, in such an ammonia oxidation catalyst device, when ammonia is oxidized at a relatively low temperature, dinitrogen monoxide (or nitrous oxide) $N_2O$ is produced. It is undesirable to release $N_2O$ into the atmosphere. Accordingly, it has been suggested that the temperature of the ammonia oxidation catalyst device be elevated not so as to oxidize ammonia at a relatively low temperature (for example, refer to Japanese Unexamined Patent Publication No. 2008-255899).

DISCLOSURE OF THE INVENTION

If ammonia is oxidized when the temperature of the ammonia oxidation catalyst device is elevated, the amount of produced $N_2O$ can be decreased. However, to elevate the temperature of the ammonia oxidation catalyst, fuel, electrical energy, or the like is necessary, and therefore fuel consumption deteriorates as a result.

Accordingly, an object of the present invention is to provide an exhaust purification system of an internal combustion engine, comprising an ammonia oxidation catalyst device, which can sufficiently decrease an amount of produced $N_2O$ without the deterioration of fuel consumption.

An exhaust purification system of an internal combustion engine as set forth in claim 1 of the present invention is provided, characterized in that the system comprises an ammonia oxidation catalyst device and an ammonia holding device arranged immediately upstream of the ammonia oxidation catalyst device, the ammonia holding device has zeolite, holds ammonia to restrain the ammonia from flowing into the ammonia oxidation catalyst device when a temperature of the ammonia oxidation catalyst device is within a $N_2O$ producing temperature range, and releases the held ammonia to make the ammonia flow into the ammonia oxidation catalyst device when the temperature of the ammonia oxidation catalyst device is out of the $N_2O$ producing temperature range.

An exhaust purification system of an internal combustion engine as set forth in claim 2 of the present invention is provided as the exhaust purification system of an internal combustion engine as set forth in claim 1 characterized in that the ammonia oxidation catalyst device has a particulate trapping function.

According to the exhaust purification system of an internal combustion engine as set forth in claim 1 of the present invention, the system comprises an ammonia oxidation catalyst device and an ammonia holding device arranged immediately upstream of the ammonia oxidation catalyst device. The ammonia holding device has zeolite and holds ammonia to restrain the ammonia from flowing into the ammonia oxidation catalyst device when a temperature of the ammonia oxidation catalyst device is within a $N_2O$ producing temperature range. Therefore, when the temperature of the ammonia oxidation catalyst device is low and is within the $N_2O$ producing temperature range, and although the temperature of the ammonia oxidation catalyst device is not elevated without the fuel consumption, a large amount of ammonia is not oxidized and a large amount of $N_2O$ is not produced. On the other hand, when the temperature of the ammonia oxidation catalyst device is out of the $N_2O$ producing temperature range, the system releases the held ammonia to make the ammonia flow into the ammonia oxidation catalyst device. Therefore, when the temperature of the ammonia oxidation catalyst device becomes high and out of the $N_2O$ producing temperature range, an amount of ammonia released from the ammonia holding device can be easily oxidized without the production of a large amount of $N_2O$. Thus, an amount of produced $N_2O$ can be sufficiently decreased without the deterioration of fuel consumption.

According to the exhaust purification system of the internal combustion engine as set forth in claim 2 of the present invention, in the exhaust purification system of an internal combustion engine as set forth in claim 1, the ammonia oxidation catalyst device has a particulate trapping function. Therefore, the particulates trapped on the ammonia oxidation catalyst device can be automatically burned by the reaction heat when the ammonia is oxidized, and thus it is not necessary that a particulate filter be separately arranged and the temperature thereof be elevated to burn the trapped particulates.

BEST MODE FOR CARRYING OUT THE INVENTION

Figure 1:
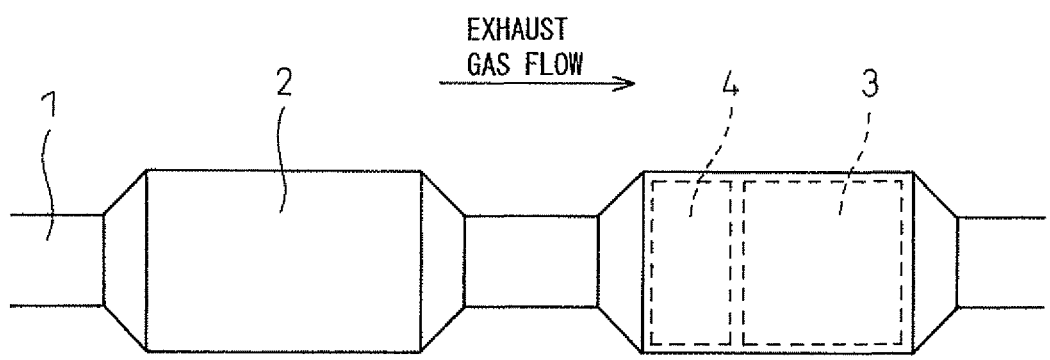
FIG. 1 is a schematic view showing an embodiment of the exhaust purification system of an internal combustion engine according to the present invention.

FIG. 1 is a schematic view showing the exhaust purification system of an internal combustion engine according to the present invention. In FIG. 1, reference numeral 1 is an exhaust passage of a diesel engine or a direct fuel injection-type spark-ignition engine which performs lean combustion. The exhaust gas of such an engine includes a relatively large amount of $NO_x$ so that a $NO_x$ catalyst device 2 for purifying $NO_x$ is arranged in the exhaust passage 1.

The $NO_x$ catalyst device 2 is a selectively reducing-type $NO_x$ catalyst device which produces ammonia by hydrolysis of urea supplied with the exhaust gas and selectively reduces $NO_x$ in the exhaust gas by using of the produced ammonia $NH_3$ as reducing material.

In the case that a selectively reducing type $NO_x$ catalyst device 2 is arranged in the exhaust passage 1, to decrease ammonia which is not used to reduce $NO_x$ and is released to the atmosphere, an ammonia oxidation catalyst device 3 for oxidizing the ammonia is arranged downstream of the selectively reduction type $NO_x$ catalyst device 2. The ammonia oxidation catalyst device 3 carries, for example, platinum Pt on a monolith carrier by alumina.

Figure 4:
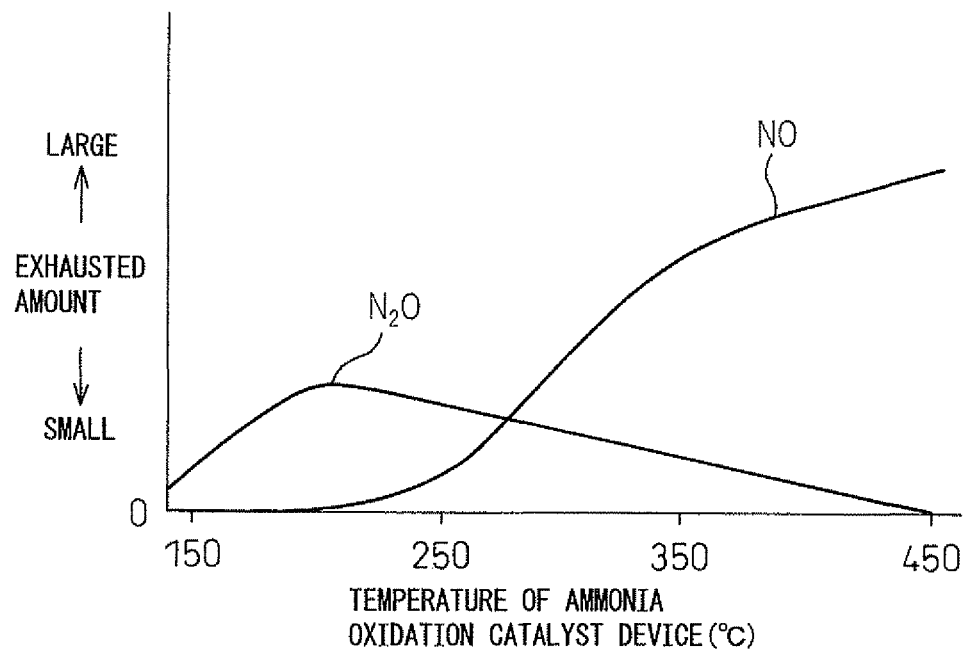
FIG. 4 are graphs slowing changes in an amount of produced $N_2O$ and an amount of produced NO according to the temperature of the ammonia oxidation catalyst device.

FIG. 4 are graphs slowing an amount of produced $N_2O$ (dinitrogen monoxide or nitrous oxide) and an amount of produced NO when ammonia is oxidized by such an ammonia oxidation catalyst device. As shown in FIG. 4, when the temperature of the ammonia oxidation catalyst device 3 is relatively low as equal to or lower than 350 degrees C. and the ammonia is oxidized by it, an amount of produced NO remarkably decreases and an amount of produced $N_2O$ remarkably increases. It is undesirable to release $N_2O$ into the atmosphere.

In the present embodiment, an ammonia holding device 4 is arranged immediately upstream of the ammonia oxidation catalyst device 3. As shown in FIG. 1, the ammonia holding device 4 is arranged in a case common to the ammonia oxidation catalyst device 3.

The ammonia holding device 4 provides solid acid for holding ammonia on a monolith carrier and, for example, forms a zeolite layer as a solid acid on the monolith carrier, or may be zeolite having a monolith shape.

Figure 5:
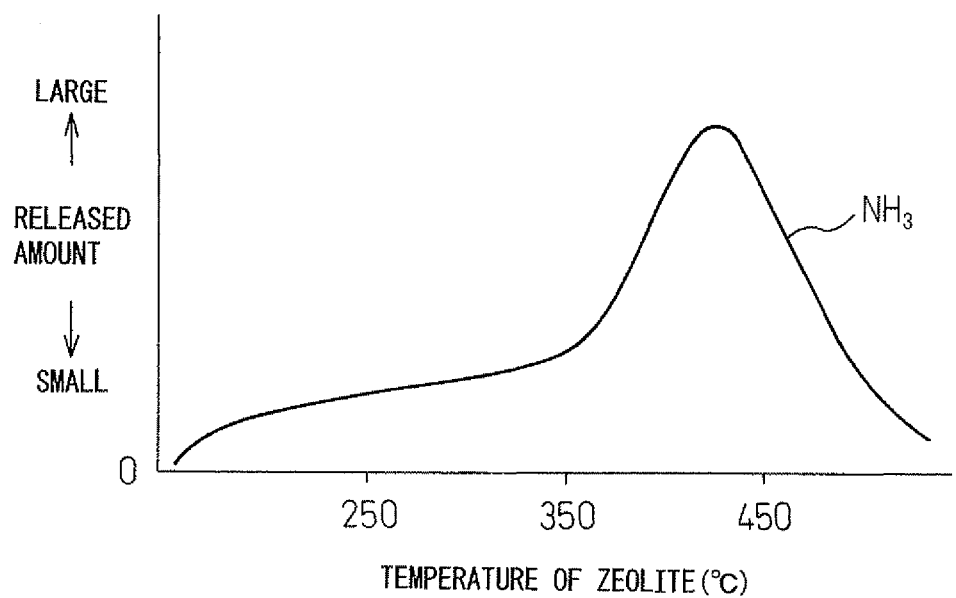
FIG. 5 is a graph showing a change in an amount of released ammonia according the temperature of zeolite.

FIG. 5 is a graph showing a change in an amount of released ammonia according to the temperature of zeolite. A solid acid, such as zeolite, sufficiently holds ammonia when the temperature thereof is equal to or lower than 350 degrees C. and releases the held ammonia when the temperature thereof is over 350 degrees C.

Accordingly, if the ammonia holding device 4 provided with the zeolite layer is arranged immediately upstream of the ammonia oxidation catalyst device 3, the temperature of the ammonia holding device 4 is equal to about the temperature of the ammonia oxidation catalyst device 3. Thus, when the temperature of the ammonia oxidation catalyst device 3 is within a $N_2O$ producing temperature range (for example, equal to or lower than 350 degrees C.), the ammonia holding device 4 sufficiently holds ammonia flowing out from the selectively reducing type $NO_x$ catalyst device 2 and can sufficiently restrain the ammonia from flowing into the ammonia oxidation catalyst device 3.

When the temperature of the ammonia oxidation catalyst device 3 is out of the $N_2O$ producing temperature range (for example, higher than 350 degrees C.), the ammonia holding device 4 releases the held ammonia and makes the ammonia flow into the ammonia oxidation catalyst device 3. In this case, when the ammonia is oxidized in the ammonia oxidation catalyst device 3, $N_2O$ is not easily produced, but NO or $N_2$ is easily produced. Thus, an amount of $N_2O$ produced when ammonia is oxidized can be sufficiently decreased especially without the elevation of the temperature of the ammonia oxidation catalyst device 3.

If the ammonia holding device 4 has any solid acid, which is not limited to zeolite, it can hold ammonia within the $N_2O$ producing temperature range and can releases the ammonia out of the $N_2O$ producing temperature range. Solid acid such as for example, titania, zirconia, or silica may be carried on the monolith carrier by alumina.

Incidentally, particulates are included in the exhaust gas of a diesel engine and a particulate filter may be arranged in the exhaust passage 1 to restrain the particulates from being emitted into the atmosphere. Accordingly, the ammonia oxidation catalyst device 3 may function as the particulate filter.

Figure 2:
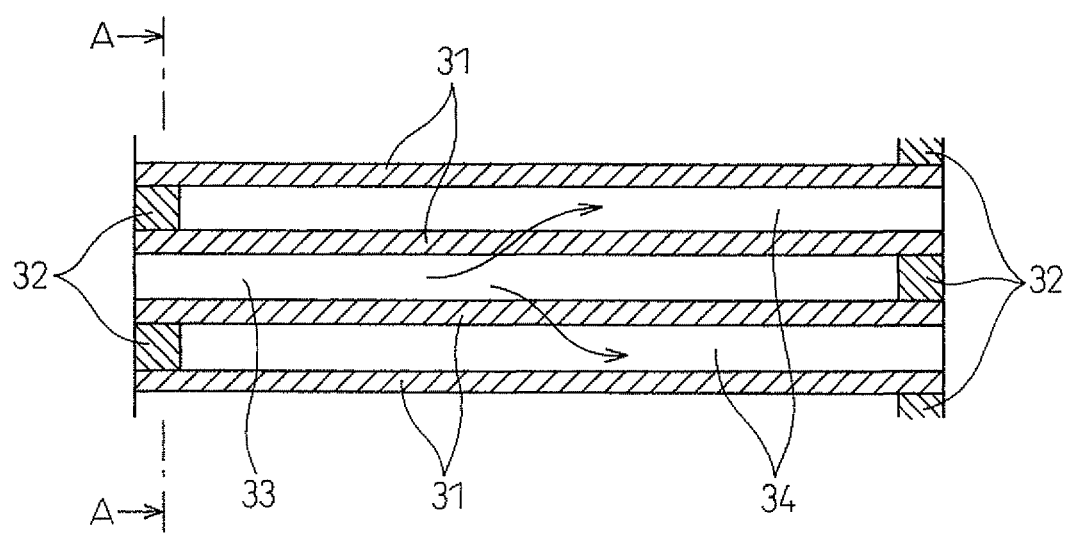
FIG. 2 is an enlarged partial vertical sectional view of an ammonia oxidation catalyst device with a particulate trapping function.
Figure 3:
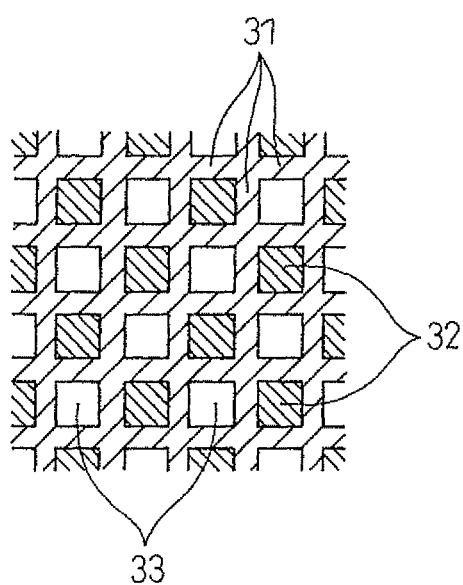
FIG. 3 is an A-A sectional view of FIG. 2.

FIG. 2 is an enlarged partial vertical sectional view of the ammonia oxidation catalyst device 3 with a particulate trapping function. FIG. 3 is an A-A sectional view of FIG. 2.

As shown in FIGS. 2 and 3, the carrier of the ammonia oxidation catalyst device 3 is formed of a porous material, such as cordierite, and has many spaces in the axial direction divided by many partition walls 31 extending in the axial direction. One of any two neighboring spaces in the axial direction is closed by a plug 32 on the exhaust gas downstream side, and the other one is closed by a plug on the exhaust gas upstream side. Thus, one of the two neighboring spaces in the axial direction serves as an exhaust gas flow-in passage 33 and the other one serves as an exhaust gas flow-out passage 34, causing the exhaust gas to pass through the partition wall 31 as indicated by arrows in FIG. 2. The particulates in the exhaust gas are much smaller than the pores of the partition wall 31, but collide with and are trapped on the exhaust gas upstream side surface of the partition wall 31 and the pores surface in the partition wall 31. Thus, each partition wall 31 can work as a trapping wall for trapping the particulates. Platinum Pt as an oxidation catalyst is carried on both side surfaces of the partition wall 31 by use of alumina.

In this way, if the ammonia oxidation catalyst device 3 also functions as the particulate filter, the particulates trapped on the partition wall 31 can be automatically burned by the reaction heat when the ammonia is oxidized. Therefore, in comparison with arranging a particulate filter separately in the exhaust passage, the cost of the exhaust gas purification system can be reduced and it is not necessary that, for example, an oxidation catalyst be arranged on the particulate filter and fuel is supplied to the particulate filter in order to burn the trapped particulates.

LIST OF REFERENCE NUMERALS

1: exhaust passage
2: $NO_x$ catalyst device
3: ammonia oxidation catalyst device
4: ammonia holding device

The invention claimed is:

1. An exhaust purification system of an internal combustion engine, comprising:
   an ammonia oxidation catalyst device;
   an ammonia holding device arranged immediately upstream of and in a case with said ammonia oxidation catalyst device; and
   a selectively reducing $NO_x$ catalyst device upstream of said ammonia holding device;
   wherein:
   said ammonia holding device has zeolite and is configured to:
      hold ammonia to restrain the ammonia from flowing into said ammonia oxidation catalyst device when a temperature of said ammonia oxidation catalyst device is within a $N_2O$ producing temperature range, and
      release the held ammonia to make the ammonia flow into said ammonia oxidation catalyst device when the temperature of said ammonia oxidation catalyst device is out of the $N_2O$ producing temperature range; and
   said $N_2O$ producing temperature range is not more than 350° C.

2. The exhaust purification system of an internal combustion engine according to claim 1, wherein said ammonia oxidation catalyst device has a particulate trapping function.

* * * * *